US012386659B2

(12) United States Patent
Dutu et al.

(10) Patent No.: US 12,386,659 B2
(45) Date of Patent: Aug. 12, 2025

(54) SCHEDULING MULTIPLE PROCESSING-IN-MEMORY (PIM) THREADS AND NON-PIM THREADS

(71) Applicant: Advanced Micro Devices, Inc., Santa Clara, CA (US)

(72) Inventors: Alexandru Dutu, Kirkland, WA (US); Niti Madan, Bee Cave, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 99 days.

(21) Appl. No.: 18/214,733

(22) Filed: Jun. 27, 2023

(65) Prior Publication Data

US 2025/0004826 A1 Jan. 2, 2025

(51) Int. Cl.
*G06F 9/48* (2006.01)
*G06F 12/08* (2016.01)

(52) U.S. Cl.
CPC ............ *G06F 9/4881* (2013.01); *G06F 12/08* (2013.01)

(58) Field of Classification Search
None
See application file for complete search history.

(56) References Cited

U.S. PATENT DOCUMENTS

| 12,032,925 | B1* | 7/2024 | Kim | G06F 7/523 |
| 2017/0277440 | A1* | 9/2017 | Willcock | G06F 12/08 |
| 2021/0110876 | A1* | 4/2021 | Seo | G06F 13/1668 |
| 2021/0208880 | A1* | 7/2021 | Song | G06F 9/30029 |
| 2024/0220107 | A1* | 7/2024 | Dutu | G06F 3/061 |

* cited by examiner

Primary Examiner — Michael Sun
(74) Attorney, Agent, or Firm — FIG. 1 Patents

(57) ABSTRACT

Scheduling requests of multiple processing-in-memory threads and requests of multiple non-processing-in-memory threads is described. In accordance with the described techniques, a memory controller receives a plurality of processing-in-memory threads and a plurality of non-processing-in-memory threads from a host. The memory controller schedules an order of execution for requests of the plurality of processing-in-memory threads and requests of the plurality of non-processing-in-memory threads based on a priority associated with each of the requests and a current operating mode of the system. Requests are maintained in queues at the memory controller and are individually assigned a priority level based on time enqueued at the memory controller. Requests of a different mode than a current operating mode of the system are delayed for scheduling until at least one different mode request is escalated to a maximum priority value, at which point the memory controller initiates a system mode switch.

20 Claims, 6 Drawing Sheets

SCHEDULING MULTIPLE PROCESSING-IN-MEMORY (PIM) THREADS AND NON-PIM THREADS

BACKGROUND

Processing-in-memory move processing of (PIM) architectures memory-intensive computations to memory. This contrasts with standard computer architectures which communicate data back and forth between a memory and a remote processing unit. In terms of data communication pathways, remote processing units of conventional computer architectures are further away from memory than processing-in-memory components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the remote processing unit is large.

Thus, PIM architectures enable increased computer performance while reducing data transfer latency as compared to conventional computer architectures that implement remote processing hardware. However, in PIM architectures where a memory controller receives requests from threads for both PIM operations (e.g., operations performed by a PIM component) and non-PIM operations (e.g., operations performed by a remote processing unit), extending conventional techniques for scheduling only non-PIM requests (e.g., based on static timing thresholds) to scheduling both PIM and non-PIM request threads results in degraded system performance.

DETAILED DESCRIPTION

Overview

Figure 1:
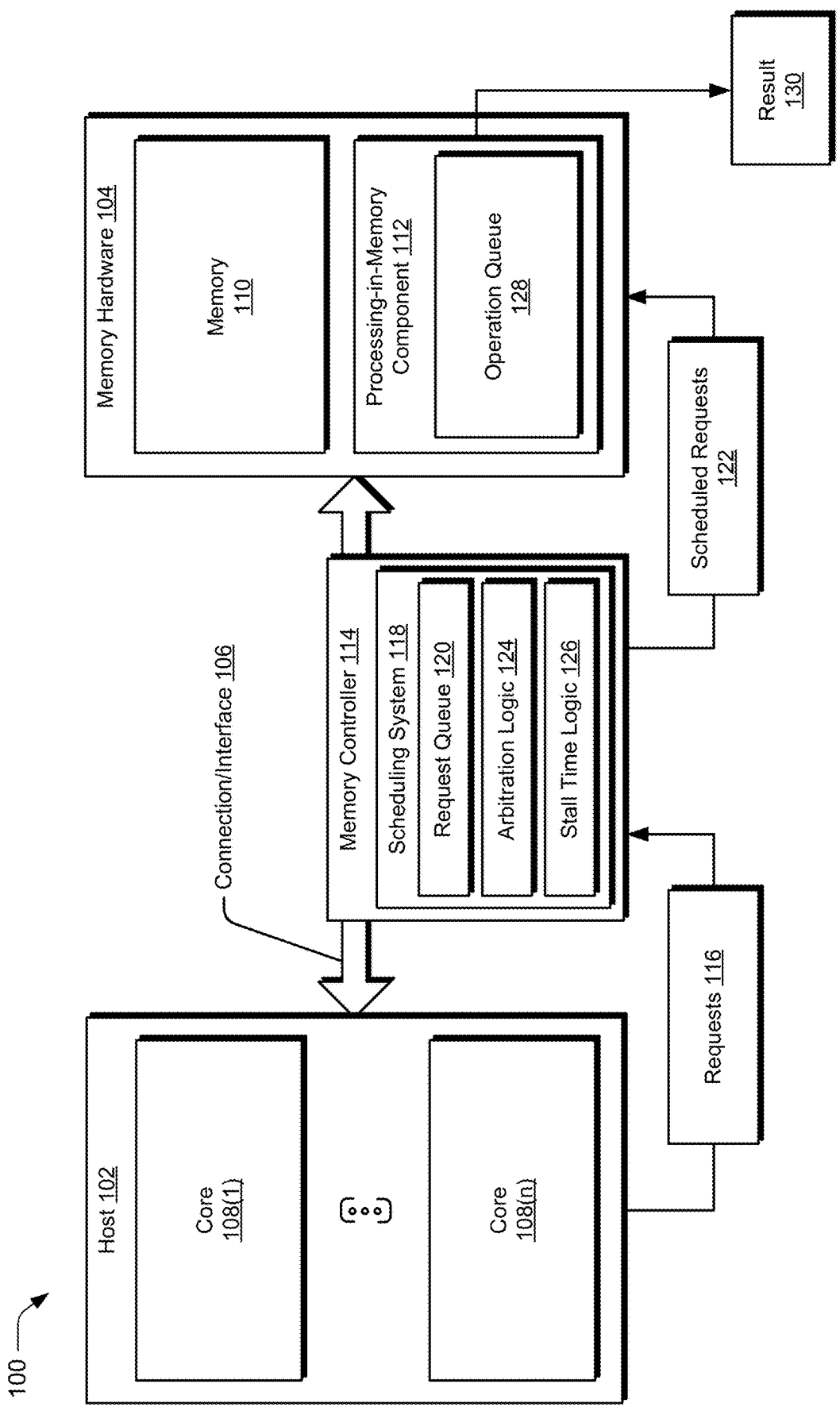
FIG. 1 is a block diagram of an example system having a host with at least one core, memory hardware that includes a memory and a processing-in-memory component, and a memory controller.

Computer architectures with PIM components implement processing devices embedded in memory hardware (e.g., memory chips). By implementing PIM components in memory hardware, PIM architectures are configured to provide memory-level processing capabilities to a variety of applications, such as applications executing on a host processing device that is communicatively coupled to the memory hardware. In such implementations where the PIM component provides memory-level processing for an application executed by the host processing device, the host processing device controls the PIM component by dispatching one or more application operations for performance to the PIM component. In some implementations, operations dispatched by the host processing device for performance by the PIM component are sent in the form of PIM requests to a memory controller. In some implementations, PIM requests are related as part of a PIM thread, where PIM requests of the PIM thread correspond to a sequence of instructions that are constrained for execution in a defined order.

In addition to scheduling requests of PIM threads for execution by the PIM component, the memory controller is tasked with scheduling non-PIM requests made by the host processing device. In contrast to PIM requests, which are executed by the PIM component using data stored in memory and thus executed by the PIM component independent of (e.g., without) traffic on a connection between memory hardware and the host processing device, executing non-PIM requests involves communicating data from memory hardware to the host processing device for processing by the host processing device. In some cases, executing non-PIM requests further involves communicating data from the host processing device back to memory hardware (e.g., transmitting a result generated by the host processing device to memory hardware for storage).

In implementations, execution of a PIM request requires bank-level parallelism in memory. Bank-level parallelism is defined as different banks of a memory channel being used to service one or more requests in parallel. For instance, in an example scenario where executing a PIM request causes a PIM component to perform an operation using data stored in a defined row of each bank in a dynamic random-access memory (DRAM) channel, bank-level parallelism is required to ensure that each bank in the DRAM channel is available before the PIM request can be executed. In contrast to PIM requests that provide bank-level parallelism in memory (e.g., PIM requests are serviced with memory commands that are sent to all banks in a DRAM channel), non-PIM requests are serviced using memory commands issued to a single row in memory (e.g., a single row of a single DRAM channel bank).

Due to the bank-level parallelism involved with executing PIM requests, scheduling PIM requests and non-PIM requests directed to a common memory channel is challenging. For instance, PIM requests cannot be executed simultaneously with executing non-PIM requests. Accordingly, a memory controller tasked with scheduling both PIM requests and non-PIM requests is also tasked with switching between two modes: one mode where PIM requests are serviced for execution by a PIM component and another mode where non-PIM requests are serviced.

One challenge in transitioning from a non-PIM mode (e.g., where only non-PIM requests are executed) to a PIM mode (e.g., where only PIM requests are executed) is that all banks in a memory channel (e.g., all rows in each bank of a DRAM channel) must first be closed. This bank closure is required in order for a PIM component to service (e.g., execute) a PIM request by issuing commands on one or more rows in multiple memory channel banks. Transitioning a from a non-PIM mode to a PIM mode thus incurs a high penalty in terms of computational cost, as each bank in a memory channel needs to be pre-charged for a mode switch.

For instance, in an implementation where a PIM request is executed by a PIM component of a DRAM channel, capacitors of each bank that was previously open need to be charged (e.g., by applying current to a capacitor to rewrite or otherwise restore a data value that was read from the capacitor while the bank was open). After pre-charging memory channel banks, the memory controller is able to switch to a PIM mode where a PIM component performs one or more operations (e.g., read, write, etc.) as part of executing a PIM request on one or more rows in each of the memory channel banks.

Computer applications that are coded to include PIM operations typically dispatch PIM threads, and requests thereof, at irregular intervals. For instance, in an example scenario where a host processing device is running an application that includes both PIM operations and non-PIM operations, the host processing device sends a cadence of non-PIM requests to a memory controller and interleaves the non-PIM request with bursts of PIM requests for one or more PIM threads.

Consequently, because there is not a constant arrival rate of PIM requests at the memory controller in this example scenario, it becomes difficult to decide when to switch between operating in a PIM mode and operating in a non-PIM mode in a manner that optimizes system performance. As described herein, optimizing system performance involves decreasing computational resource consumption, reducing system latency, reducing system power consumption, combinations thereof, and so forth.

Selecting when to switch between a PIM mode and a non-PIM mode is further compounded when non-PIM requests are also received by a memory controller at irregular intervals from a host processing device. Many conventional systems implement static thresholds for switching between a PIM mode and a non-PIM mode based on a stall time of a pending request. For instance, in response to identifying that a PIM request pending at a memory controller has been stalled for a duration that approaches a defined stall time threshold for PIM requests, conventional systems switch from a non-PIM mode to a PIM mode in order to service the PIM request before its stall time satisfies (e.g., is greater than or equal to) the defined stall time threshold for PIM requests.

Similarly, in response to identifying that a non-PIM request has been stalled for a duration that approaches a defined stall time threshold for non-PIM requests, conventional system memory controllers switch from a PIM mode to a non-PIM mode in order to service the non-PIM request before its stall time satisfies the defined stall time threshold for non-PIM requests. However, such conventional static stall thresholds are sub-optimal because they do not account for the irregularity of PIM requests received by a memory controller, scenarios where non-PIM requests are received by the memory controller at irregular intervals, a density of PIM requests received in a burst of PIM request by the memory controller, and so forth. Consequently, switching between PIM and non-PIM modes using conventional static thresholds results in unnecessary consumption of computational resources, unnecessary latency in scheduling requests for execution, and overall degraded system performance.

To address these problems facing conventional computer architectures with PIM components, scheduling multiple PIM threads, which each include multiple PIM requests, together with non-PIM threads is described. In implementations, a system includes memory hardware having a memory and a PIM component. The memory hardware is communicatively coupled to at least one core of at least one host, such as a core of a host processor. The system further includes a memory controller, such as a memory controller implemented locally at a host processor, a memory controller implemented at the memory module, or a memory controller implemented separate from a host processor and separate from the memory module. In implementations, the memory controller implements a scheduling module that is configured to schedule PIM requests from multiple PIM threads, along with non-PIM requests, received at the memory controller.

Advantageously, the scheduling module is configured to schedule execution of PIM requests from different PIM threads in a different order than an order in which the respective different PIM threads are received at the memory controller. This represents an improvement over conventional systems that are limited to scheduling PIM requests from different PIM threads based on an order of arrival of the different PIM threads at the memory controller. To do so, the scheduling module identifies when different PIM threads access different physical addresses in the memory and efficiently schedules PIM requests from different PIM threads in a manner that optimizes system performance rather than being constrained by order of arrival at the memory controller. In doing so, the scheduling module reduces an amount of row conflicts caused by requests from different threads relative to conventional systems that schedule PIM requests based on an order of arrival at the memory controller. The scheduling module does so by assigning priority levels to individual PIM requests and individual non-PIM requests enqueued at the memory controller based on a respective time at which each request has been enqueued at the memory controller.

To perform the techniques described herein, the memory controller includes a non-PIM queue and a PIM queue. The non-PIM queue is configured to enqueue non-PIM requests (e.g., DRAM commands) received from a host processor and the PIM queue is configured to enqueue PIM requests (e.g., requests to be executed by a PIM component of the memory module) received from the host processor. The scheduling module of the memory controller includes a three-stage arbitration system that schedules PIM requests and non-PIM requests for execution based on request type and request priority, with deference to a current operating mode of the system (e.g., a PIM mode where PIM requests are executed and a non-PIM mode where non-PIM requests are executed).

The three-stage arbitration system is configured to consider both PIM requests and non-PIM requests at each stage of arbitration. In implementations, a first arbiter (e.g., a first arbitration stage) of the arbitration system selects different types of PIM requests from the memory controller's PIM queue and different types of non-PIM requests from the memory controller's non-PIM queue. For instance, the first arbiter selects a page hit request, a page miss request, and a page conflict request from the PIM queue. The first arbiter additionally selects a page hit request, a page miss request, and a page conflict request from the non-PIM queue. The PIM queue is organized such that PIM requests of a common thread are arranged in a dependent manner, ensuring that PIM requests for a given thread are scheduled in the proper sequence.

A second arbiter (e.g., a second arbitration stage) of the arbitration system compares priorities of the requests (both PIM and non-PIM) selected by the first arbiter and outputs a request having a highest associated priority. In scenarios where requests selected by the first arbiter have the same priority, the second arbiter outputs one of the requests according to a request ranking based on request type. In some implementations, the request ranking used by the second arbiter depends on an operating mode of the system at the time the requests will be scheduled for execution (e.g., whether the system will be operating in a PIM mode or a non-PIM mode).

For instance, the second arbiter is configured to identify whether a request to be scheduled will be scheduled with the system is operating in a PIM mode or a non-PIM mode. The second arbiter prioritizes scheduling requests having a same type as the current operating mode (e.g., prioritizes scheduling PIM requests when the system is operating in a PIM mode and prioritizes scheduling non-PIM requests when the system is operating in a non-PIM mode). When prioritizing requests for scheduling, the second arbiter considers priority information associated with each request, which represents a stall time of the request. In situations where, during a PIM mode, no enqueued non-PIM requests are associated with a maximum priority level, the second arbiter prioritizes selecting enqueued PIM requests. Similarly, during a non-PIM mode, when no enqueued PIM requests are associated with the maximum priority level, the second arbiter prioritizes selecting enqueued non-PIM requests.

To optimize system performance, the second arbiter refrains from selecting a request of a different type than a current operating mode (e.g., at the time the selected request is scheduled to be executed by the system) until the request of the different type reaches a maximum priority level. For instance, if during a PIM mode, no enqueued PIM requests are associated with the maximum priority level and at least one enqueued non-PIM request is associated with the maximum priority level, the second arbiter initiates a mode switch and selects a maximum priority non-PIM request. Similarly, if during a non-PIM mode, no enqueued non-PIM requests are associated with the maximum priority level and at least one enqueued PIM request is at the maximum priority level, the second arbiter initiates a mode switch by scheduling the maximum priority PIM request.

A third arbiter (e.g., a third arbitration stage) of the arbitration system then schedules an execution order for the requests output by the second arbiter. In implementations where the memory controller is tasked with scheduling requests for a memory channel allocated into multiple pseudo-channels (e.g., two or more pseudo-channels), the first and second arbiters are configured to perform their functionality for each pseudo-channel simultaneously. In such scenarios where the memory channel is allocated into multiple pseudo-channels, the third arbiter schedules requests output by the second arbiter (e.g., the priority winner for each of the multiple pseudo-channels) in a round-robin manner.

By implementing the arbitration system and considering historical system performance metrics, the scheduling module is configured to switch the system between operating in a PIM mode and operating in a non-PIM mode based on associated priority levels and stall times during which request are enqueued at a memory controller. The scheduling policy enforced by the scheduling module is thus configured to adapt to dynamic characteristics of PIM and non-PIM operations and/or applications running concurrently in a manner that improves system performance by switching PIM and non-PIM execution modes at optimal cycles, without being constrained by an order of arrival of PIM thread operations, which is also not possible using conventional scheduling policies.

Although described with respect to a single PIM component, the techniques described herein are configured for implementation by multiple processing-in-memory components in parallel (e.g., simultaneously). For instance, in an example scenario where memory is configured as DRAM, a processing-in-memory component is included at each hierarchical DRAM component (e.g., channel, bank, array, and so forth).

In some aspects, the techniques described herein relate to a system including memory hardware including a memory and a processing-in-memory component, a host including at least one core, and a memory controller configured to receive, from the host, a plurality of processing-in-memory threads and a plurality of non-processing-in-memory threads, and schedule an order of execution for requests of the plurality of processing-in-memory threads and requests of the plurality of non-processing-in-memory threads based on a priority associated with each of the requests and a current operating mode of the system.

In some aspects, the techniques described herein relate to a system, wherein the current operating mode of the system is executing processing-in-memory requests and the order of execution prioritizes scheduling the requests of the plurality of processing-in-memory threads responsive to priorities associated with the requests of the plurality of non-processing-in-memory threads not satisfying a maximum priority level.

In some aspects, the techniques described herein relate to a system, wherein the current operating mode of the system is executing processing-in-memory requests and the order of execution prioritizes scheduling the requests of the plurality of non-processing-in-memory threads responsive to a priority associated with at least one request of the plurality of non-processing-in-memory threads satisfying a maximum priority level.

In some aspects, the techniques described herein relate to a system, wherein the current operating mode of the system is executing non-processing-in-memory requests and the order of execution prioritizes scheduling the requests of the plurality of non-processing-in-memory threads responsive to priorities associated with the requests of the plurality of processing-in-memory threads not satisfying a maximum priority level.

In some aspects, the techniques described herein relate to a system, wherein the current operating mode of the system is executing non-processing-in-memory requests and the order of execution prioritizes scheduling the requests of the plurality of processing-in-memory threads responsive to a priority associated with at least one request of the plurality of processing-in-memory threads satisfying a maximum priority level.

In some aspects, the techniques described herein relate to a system, wherein the memory hardware is configured to execute requests of the plurality of processing-in-memory threads by causing the processing-in-memory component to execute one or more operations using data stored in the memory.

In some aspects, the techniques described herein relate to a system, wherein the host is configured to execute requests of the plurality of non-processing-in-memory threads by obtaining data stored in the memory and causing the at least one core to execute one or more operations using the data.

In some aspects, the techniques described herein relate to a system, wherein the order of execution includes scheduling requests of the plurality of processing-in-memory threads in an order that is different from an order in which the requests of the plurality of processing-in-memory threads are received at the memory controller from the host.

In some aspects, the techniques described herein relate to a system, wherein the memory controller is associated with a channel in the memory and the channel in the memory is allocated into two or more pseudo-channels.

In some aspects, the techniques described herein relate to a system, wherein the memory controller is configured to schedule the order of execution by selecting, for each pseudo-channel of the memory, different types of requests from the plurality of processing-in-memory threads and different types of requests from the plurality of non-processing-in-memory threads using a first arbiter.

In some aspects, the techniques described herein relate to a system, wherein the first arbiter selects, for each pseudo-channel of the memory, one hit request, one miss request, and one conflict request from the plurality of processing-in-memory threads.

In some aspects, the techniques described herein relate to a system, wherein the first arbiter selects, for each pseudo-channel of the memory, one hit request, one miss request, and one conflict request from the plurality of non-processing-in-memory threads.

In some aspects, the techniques described herein relate to a system, wherein the memory controller is configured to schedule the order of execution by selecting, using a second arbiter and for each pseudo-channel of the memory, one request from the different types of requests from the plurality of processing-in-memory threads and the different types of requests from the plurality of non-processing-in-memory threads that were selected by the first arbiter.

In some aspects, the techniques described herein relate to a system, wherein the second arbiter is configured to select the one request for each pseudo-channel of the memory based on priority information associated with each of the different types of requests from the plurality of processing-in-memory threads and the different types of requests from the plurality of non-processing-in-memory threads that were selected by the first arbiter.

In some aspects, the techniques described herein relate to a system, wherein the memory controller is configured to schedule the order of execution using a third arbiter that defines an ordering of requests selected by the second arbiter.

In some aspects, the techniques described herein relate to a method including identifying, by a memory controller of a system, that the system is operating in a processing-in-memory mode, receiving, by the memory controller from a host of the system, a plurality of processing-in-memory threads and a plurality of non-processing-in-memory threads, and scheduling, by the memory controller, an order of execution for requests of the plurality of processing-in-memory threads and requests of the plurality of non-processing-in-memory threads by prioritizing requests of the plurality of processing-in-memory threads responsive to identifying that requests of the plurality of non-processing-in-memory threads do not satisfy a maximum priority stall threshold, and prioritizing requests of the plurality of non-processing-in-memory threads responsive to identifying that at least one of the requests of the plurality of non-processing-in-memory threads satisfies the maximum priority stall threshold.

In some aspects, the techniques described herein relate to a method, wherein prioritizing the requests of the plurality of non-processing-in-memory threads is further performed responsive to identifying that the requests of the plurality of processing-in-memory threads do not satisfy the maximum priority stall threshold.

In some aspects, the techniques described herein relate to a method, further including incrementing stall counters for requests enqueued at a request queue of the memory controller and updating priority levels of the requests enqueued at the request queue during the scheduling the order of execution.

In some aspects, the techniques described herein relate to a method including identifying, by a memory controller of a system, that the system is operating in a non-processing-in-memory mode, receiving, by the memory controller from a host of the system, a plurality of processing-in-memory threads and a plurality of non-processing-in-memory threads, and scheduling, by the memory controller, an order of execution for requests of the plurality of processing-in-memory threads and requests of the plurality of non-processing-in-memory threads by prioritizing requests of the plurality of non-processing-in-memory threads responsive to identifying that requests of the plurality of processing-in-memory threads do not satisfy a maximum priority stall threshold, and prioritizing requests of the plurality of processing-in-memory threads responsive to identifying that at least one of the requests of the plurality of processing-in-memory threads satisfies the maximum priority stall threshold.

In some aspects, the techniques described herein relate to a method, wherein prioritizing the requests of the plurality of processing-in-memory threads is further performed responsive to identifying that the requests of the plurality of non-processing-in-memory threads do not satisfy the maximum priority stall threshold.

FIG. 1 is a block diagram of a system 100 that includes a host with at least one core, memory hardware with a memory and a PIM component, and a memory controller configured to grant requests by the host for the PIM component to perform transactions. In particular, the system 100 includes host 102 and memory hardware 104, where the host 102 and the memory hardware 104 are communicatively coupled via connection/interface 106. In one or more implementations, the host 102 includes at least one core 108. In some implementations, the host 102 includes multiple cores 108. For instance, in the illustrated example of FIG. 1, host 102 is depicted as including core 108(l) and core 108 (n), where n represents any integer. The memory hardware 104 includes memory 110 and processing-in-memory component 112.

In accordance with the described techniques, the host 102 and the memory hardware 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 110. Examples of the host 102 and/or a core 108 of the host include, but are not limited to, a central processing unit (CPU), a graphics processing unit (GPU), a field programmable gate array (FPGA), an accelerated processing unit (APU), and a digital signal processor (DSP). For example, in one or more implementations a core 108 is a processing unit that reads and executes instructions (e.g., of a program), examples of which include to add data, to move data, and to branch data.

In one or more implementations, the memory hardware 104 is a circuit board (e.g., a printed circuit board), on which the memory 110 is mounted and includes the processing-in-memory component 112. In some variations, one or more integrated circuits of the memory 110 are mounted on the circuit board of the memory hardware 104, and the memory hardware 104 includes one or more processing-in-memory components 112. Examples of the memory hardware 104 include, but are not limited to, a TransFlash memory module, a single in-line memory module (SIMM), and a dual in-line memory module (DIMM). In one or more implementations, the memory hardware 104 is a single integrated circuit device that incorporates the memory 110 and the processing-in-memory component 112 on a single chip. In some examples, the memory hardware 104 is composed of multiple chips that implement the memory 110 and the processing-in-memory component 112 that are vertically ("3D") stacked together, are placed side-by-side on an interposer or substrate, or are assembled via a combination of vertical stacking or side-by-side placement.

The memory 110 is a device or system that is used to store information, such as for immediate use in a device (e.g., by a core 108 of the host 102 and/or by the processing-in-memory component 112). In one or more implementations, the memory 110 corresponds to semiconductor memory where data is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM), and static random-access memory (SRAM).

In some implementations, the memory 110 corresponds to or includes a cache memory of the core 108 and/or the host 102 such as a level 1 cache, a level 2 cache, a level 3 cache, and so forth. For example, the memory 110 represents high bandwidth memory (HBM) in a 3D-stacked implementation. Alternatively or additionally, the memory 110 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM). The memory 110 is thus configurable in a variety of ways without departing from the spirit or scope of the described techniques.

Broadly, the processing-in-memory component 112 is configured to process processing-in-memory operations involved as part of one or more transactions (e.g., operations performed as part of servicing requests of a thread received from the core 108 via the connection/interface 106). The processing-in-memory component 112 is representative of a processor with example processing capabilities ranging from relatively simple (e.g., an adding machine) to relatively complex (e.g., a CPU/GPU compute core). In an example, the processing-in-memory component 112 processes requests of a thread by executing associated operations using data stored in the memory 110.

Processing-in-memory contrasts with standard computer architectures which obtain data from memory, communicate the data to a remote processing unit (e.g., a core 108 of the host 102), and process the data using the remote processing unit (e.g., using a core 108 of the host 102 rather than the processing-in-memory component 112). In various scenarios, the data produced by the remote processing unit as a result of processing the obtained data is written back to memory, which involves communicating the produced data over the connection/interface 106 from the remote processing unit to memory. In terms of data communication pathways, the remote processing unit (e.g., a core 108 of the host 102) is further away from the memory 110 than the processing-in-memory component 112, both physically and topologically. As a result, conventional computer architectures suffer from increased data transfer latency, reduced data communication bandwidth, and increased data communication energy, particularly when the volume of data transferred between the memory and the remote processing unit is large, which can also decrease overall computer performance.

Thus, the processing-in-memory component 112 enables increased computer performance while reducing data transfer energy as compared to standard computer architectures that implement remote processing hardware. Further, the processing-in-memory component 112 alleviates memory performance and energy bottlenecks by moving one or more memory-intensive computations closer to the memory 110. Although the processing-in-memory component 112 is illustrated as being disposed within the memory hardware 104, in some examples, the described benefits of memory verification using processing-in-memory are realizable through near-memory processing implementations in which the processing-in-memory component 112 is disposed in closer proximity to the memory 110 (e.g., in terms of data communication pathways) than a core 108 of the host 102.

The system 100 is further depicted as including memory controller 114. The memory controller 114 is configured to receive requests 116 from the host 102 (e.g., from a core 108 of the host 102). In the illustrated example, the requests 116 represent requests of one or more PIM threads, requests of one or more non-PIM threads, or combinations thereof. Although depicted in the example system 100 as being implemented separately from the host 102, in some implementations the memory controller is implemented locally as part of the host 102. The memory controller 114 is further configured to schedule requests 116 for a plurality of hosts, despite being depicted in the illustrated example of FIG. 1 as serving only a single host 102. For instance, in an example implementation the memory controller 114 schedules requests for PIM threads and requests for non-PIM threads for a plurality of different hosts, where each of the plurality of different hosts include one or more cores that requests 116 to the memory controller 114 for scheduling with the memory module.

In accordance with one or more implementations, the memory controller 114 is associated with a single channel of the memory 110. For instance, the system 100 is configured to include a plurality of different memory controllers 114, one for each of a plurality of channels of memory 110. The techniques described herein are thus performable using a plurality of different memory controllers to schedule requests for different channels of memory 110. In some implementations, a single channel in memory 110 is allocated into multiple pseudo-channels. In such implementations, the memory controller 114 is configured to schedule requests 116 for different pseudo-channels of a single channel in the memory 110.

As depicted in the illustrated example of FIG. 1, the memory controller 114 includes a scheduling system 118. The scheduling system 118 is representative of a digital circuit configured to schedule requests 116 (e.g., both requests of PIM threads and requests of non-PIM threads) for execution in a manner that optimizes performance of the system 100 (e.g., limits computational resource consumption, decreases latency, and reduces power consumption of the system 100) when measured over execution of the requests 116. Advantageously, using the techniques described herein, the scheduling system 118 abstains from switching between modes (e.g., switching from executing PIM requests to executing non-PIM requests, or vice versa), until requests executed in a different mode than a current mode have been stalled for a threshold duration. As described in further detail below, the threshold duration by which a request is permitted to be stalled (e.g., enqueued at the memory controller 114) is configurable on an application-specific basis, such that the scheduling system 118 optimizes system performance in context of applications or computational tasks being performed by the system 100.

To perform the techniques described herein, the scheduling system 118 includes a request queue 120. The request queue 120 is configured to maintain a queue of the requests 116 received at the memory controller 114 from the host 102. In implementations, the request queue 120 is representative of two separate queues-one queue for maintaining requests of PIM threads and another queue for maintaining requests of non-PIM threads. The scheduling system 118 is configured to schedule an order of requests 116 maintained in the request queue 120 for execution (e.g., by the processing-in-memory component 112 or by the host 102) using the techniques described herein. As depicted in the illustrated example of FIG. 1, requests selected from the request queue 120 for execution by the scheduling system 118 are represented as scheduled requests 122. In some implementations, the scheduling system 118 selects a single request from the request queue 120 for inclusion in the scheduled requests 122 per clock cycle of the system 100. Alternatively, the scheduling system 118 selects multiple requests from the request queue 120 for inclusion in the scheduled requests 122 per clock cycle.

To determine an ordering of the scheduled requests 122, the scheduling system 118 employs arbitration logic 124 and stall time logic 126. The arbitration logic 124 is configured to select, for each pseudo-channel of the memory 110, one request from the request queue 120 for output as part of the scheduled requests 122 using a three-stage arbitration process. During the three-stage arbitration process, both PIM requests and non-PIM requests are considered at each stage of arbitration. The arbitration logic 124 considers priority information associated with each request enqueued in the request queue 120 in determining which requests to select and order for output as part of the scheduled requests 122. The stall time logic 126 represents functionality of the scheduling system 118 to keep track of how long each of the requests 116 are enqueued at the request queue 120 and to adjust a priority associated with each request maintained in the request queue 120 based on its respective time enqueued, relative to predefined priorities and their associated stall thresholds.

In addition to considering request priority, the arbitration logic 124 schedules PIM requests and non-PIM requests for execution based on request type. Advantageously, in contrast to conventional systems, the scheduling system 118 enables for requests from different PIM threads to be issued as scheduled requests 122 in a different order than their order of arrival at the memory controller 114. Functionality of the arbitration logic 124 is described in further detail below with respect to FIG. 2, an example structure of the request queue 120 is described in further detail below with respect to FIG. 3, and functionality of the stall time logic 126 is described in further detail below with respect to FIG. 4.

PIM requests included in the scheduled requests 122 are transmitted by the memory controller 114 to an operation queue 128 of the processing-in-memory component 112. The operation queue 128 is representative of a data storage structure in the processing-in-memory component 112 that maintains an ordered list of operations scheduled for sequential execution by the processing-in-memory component 112 using data stored in memory 110. As part of executing a PIM request, the processing-in-memory component 112 generates a result 130 that includes data generated from processing data stored in the memory 110 during one or more operations involved in executing a PIM request.

Instructions included in a PIM request for outputting the result 130 are configurable in a variety of manners. For instance, in some implementations executing a PIM request causes the processing-in-memory component 112 to communicate the result 130 to a requesting source for the transaction (e.g., the host 102). Alternatively or additionally, in some implementations instructions included in the PIM request cause the processing-in-memory component 112 to output the result 130 to a storage location in memory 110 (e.g., to update data stored in memory 110, for subsequent access and/or retrieval by the host 102, and so forth). Alternatively or additionally, in some implementations instructions included in the PIM request cause the processing-in-memory component 112 to store the result 130 locally (e.g., in a register of the processing-in-memory component 112).

Because the processing-in-memory component 112 executes PIM requests on behalf of the host 102, the processing-in-memory component 112 is configured to execute PIM requests with minimal impact on the system 100 (e.g., without invalidating caches of the system 100 or causing traffic on the connection/interface 106). For instance, the processing-in-memory component 112 performs PIM request on the memory 110 "in the background" with respect to the host 102 and the core 108, which frees up cycles of the host 102 and/or the core 108, reduces memory bus traffic (e.g., reduces traffic on the connection/interface 106), and reduces power consumption relative to performing operations at the host 102 and/or the core 108. Notably, because the processing-in-memory component 112 is closer to the memory 110 than the core 108 of the host 102 in terms of data communication pathways, evaluating data stored in memory 110 is generally completable in a shorter amount of time using the processing-in-memory component 112 than if the evaluation were performed using the core 108 of the host 102.

Non-PIM requests included in the scheduled requests 122 include one or more commands that cause the memory hardware 104 to transmit data stored in the memory 110 (e.g., at one or more storage locations identified by a non-PIM request) to the host 102 (e.g., via the interface 106) for further processing. In some implementations, executing a non-PIM request causes the host 102 to output a result to a storage location in memory 110 (e.g., to update data stored in memory 110, for subsequent access and/or retrieval by the host 102 or the processing-in-memory component 112, and so forth). Alternatively or additionally, in some implementations instructions included in the non-PIM request cause the host 102 to store a result of the non-PIM request locally (e.g., in a buffer, a register, or the like of the host 102).

Figure 2:
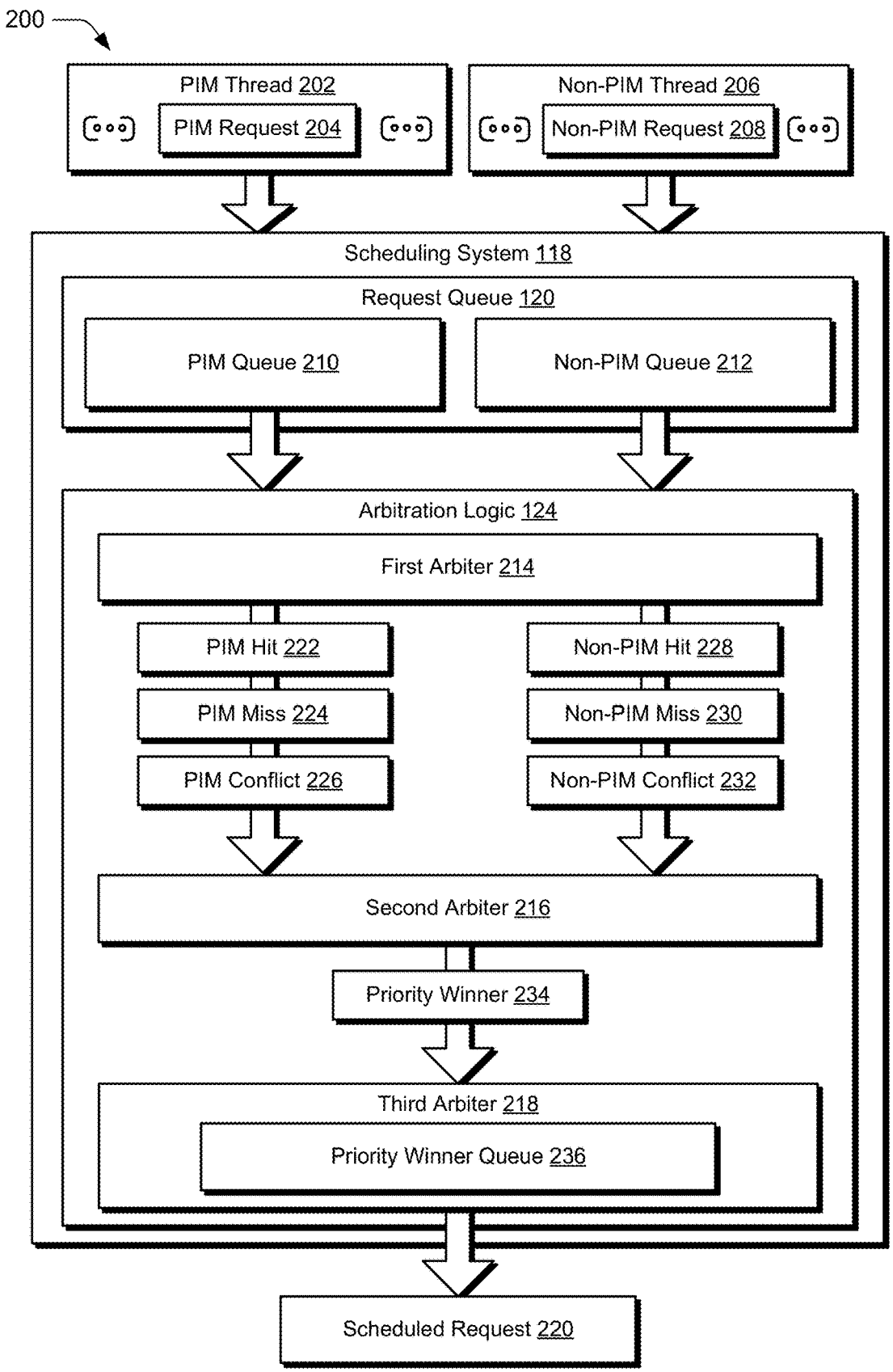
FIG. 2 depicts an example of scheduling requests of multiple processing-in-memory threads with non-processing-in-memory threads.

FIG. 2 depicts an example 200 of adaptive scheduling requests for multiple processing-in-memory threads and multiple non-processing-in-memory threads.

The example 200 is depicted as including the scheduling system 118, the request queue 120, and the arbitration logic 124 of the memory controller 114. In the example 200, the scheduling system 118 is depicted as receiving at least one PIM thread 202 that includes at least one PIM request 204. The scheduling system 118 is further depicted as receiving at least one non-PIM thread 206 that includes at least one non-PIM request 208. In this manner, the PIM request 204 and the non-PIM request 208 are each example instances of the requests 116.

As described herein, requests of a PIM thread (e.g., PIM thread 202) are required to be scheduled sequentially with respect to other requests of the same PIM thread. Similarly, requests of a non-PIM thread (e.g., non-PIM thread 206) are required to be scheduled sequentially with respect to other requests of the same non-PIM thread. The techniques described herein, however, enable the scheduling system 118 to schedule requests from different PIM threads and/or different non-PIM threads in an order that differs from an order in which the requests 116 are received at the memory controller 114, while ensuring that requests 116 of a common thread (e.g., PIM thread 202) are scheduled sequentially for the thread.

the request queue 120 includes a PIM queue 210 and a non-PIM queue 212. The PIM queue 210 is configured to maintain PIM requests (e.g., PIM request 204) received at the memory controller 114 and the non-PIM queue 212 is configured to maintain non-PIM requests (e.g., non-PIM request 208) received at the memory controller 114. In implementations, each request enqueued at the request queue 120 (e.g., in the PIM queue 210 or the non-PIM queue 212) includes information describing a thread identifier for the request.

In implementations, the thread identifier associated with a request is generated by the memory controller 114 and represents a combination of a requestor identifier (e.g., an identifier of the host 102 from which the request was received) and a process identifier (e.g., a process, thread, or stream of requests with which the request is associated). By generating thread identifiers for different requests, the memory controller 114 ensures that enqueued requests for a same process/thread are scheduled in order relative to one another, while allowing for requests from different processes/threads to be scheduled out of order relative to one another (e.g., based on request priority and stall time thresholds).

As depicted in the example 200, the arbitration logic 124 is configured as a three-stage arbitration system that is configured to schedule an order of execution for requests maintained in the request queue 120. Different stages of the arbitration logic 124 are represented in the illustrated example 200 by the first arbiter 214, the second arbiter 216, and the third arbiter 218. The first arbiter 214, the second arbiter 216, and the third arbiter 218 work together to select requests from both the PIM queue 210 and the non-PIM queue 212 and output one of the selected requests as a scheduled request 220, where the scheduled request 220 represents a request included in the scheduled requests 122.

In implementations, the first arbiter 214 is configured to select different types of PIM requests from the PIM queue 210 and select different types of non-PIM requests from the non-PIM queue 212. For instance, the first arbiter 214 selects a PIM hit 222 request, a PIM miss 224 request, and a PIM conflict 226 request from the PIM queue 210. The first arbiter 214 further selects a non-PIM hit 228 request, a non-PIM miss 230 request, and a non-PIM conflict 232 request from the non-PIM queue 212. As described herein, a hit request (e.g., a PIM hit 222 or a non-PIM hit 228) refers to a request that, at the time of execution, uses data stored in a memory location that is already open (e.g., a request for data stored in a DRAM row of the memory 110 that is open). A miss request (e.g., a PIM miss 224 or a non-PIM miss 230) refers to a request that, at the time of execution, uses data stored in a memory location that is not open (e.g., a request for data stored in a closed DRAM row of the memory 110). A conflict request (e.g., a PIM conflict 226 or a non-PIM conflict 232) refers to a request that, at the time of execution, requires use of data that is being used by at least one other request.

In some implementations, the first arbiter 214 identifies whether a request maintained in the request queue 120 will be a hit, a miss, or a conflict if scheduled at a certain clock cycle of the system 100 based on scheduled requests 122 previously ordered for execution by the memory controller 114. In one or more implementations, the first arbiter 214 selects PIM requests from the PIM queue 210 and non-PIM requests from the non-PIM queue 212 based on a respective priority assigned to each request. For instance, the first arbiter 214 selects the PIM hit 222 request by identifying a plurality of PIM requests in the PIM queue 210 that would be hits if scheduled and selects from the plurality of PIM requests a request that has a highest priority. As described in further detail below with respect to FIG. 4, a request's priority is defined based on how long the request has been stalled at the memory controller 114 (e.g., enqueued at the request queue 120). The first arbiter 214 is thus configured to ensure that a lower priority request of a certain type is not scheduled before a higher priority request of the certain type (e.g., ensure that a higher priority PIM miss 224 request is selected over a lower priority PIM miss 224 request).

The second arbiter 216 is configured to select, from the PIM requests and non-PIM requests output by the first arbiter 214, a priority winner 234. The priority winner 234 represents one of the PIM hit 222 request, the PIM miss 224 request, the PIM conflict 226 request, the non-PIM hit 228 request, the non-PIM miss 230 request, or the non-PIM conflict 232 request. In implementations, the second arbiter 216 selects the priority winner 234 based on a current mode in which the system 100 is operating as well as respective priority information associated with the PIM hit 222 request, the PIM miss 224 request, the PIM conflict 226 request, the non-PIM hit 228 request, the non-PIM miss 230 request, and the non-PIM conflict 232 request.

As described in further detail below with respect to FIG. 4, the priority of a request is determined by comparing a stall time of the request, which indicates how long the request has been maintained in the request queue 120, to at least one priority level stall threshold. For instance, in an example scenario where a request can be classified as low priority, medium priority, high priority, or urgent priority, different stall thresholds correspond to each priority level, such that the priority level of a request is escalated when it satisfies a stall threshold. In this manner, the arbitration logic 124 escalates priority information for a request as a stall time for a request satisfies (e.g., is greater than or equal to) a stall threshold for a priority level.

Continuing the above example, in a scenario where available priority levels are Low, Medium, High, and Urgent, "Low" corresponds to a minimum priority level and "Urgent" corresponds to a maximum priority level for a request. In implementations where no request output by the first arbiter 214 are assigned a maximum priority level, the second arbiter 216 biases against mode switching and outputs a request having a highest priority that is executable in a current operating mode of the system 100. For instance, if the system 100 is currently operating in a PIM mode and no request output by the first arbiter 214 has a maximum priority, the second arbiter 216 outputs a PIM request (e.g., the PIM hit 222 request, the PIM miss 224 request, or the PIM conflict 226 request) having the highest priority as the priority winner 234. Alternatively, if the system 100 is currently operating in a non-PIM mode and no request output by the first arbiter 214 has a maximum priority, the second arbiter 216 outputs a non-PIM request (e.g., the non-PIM hit 228 request, the non-PIM miss 230 request, or the non-PIM conflict 232 request) having the highest priority as the priority winner 234.

In implementations where requests output by the first arbiter 214 are associated with the same priority and no requests output by the first arbiter 214 have a maximum priority, the second arbiter 216 selects a request for output as the priority winner 234 based on type (e.g., PIM hit, PIM miss, PIM conflict, non-PIM hit, non-PIM miss, or non-PIM conflict), constrained by a current operating mode of the system 100 (e.g., executing PIM requests or executing non-PIM requests).

For instance, in an example implementation where the system 100 is operating in a PIM mode (e.g., executing PIM requests), the second arbiter 216 selects the priority winner 234 based on a request ranking that favors PIM hits over PIM misses over PIM conflicts. As a specific example, in a situation where the system 100 is operating in a PIM mode, no non-PIM requests output by the first arbiter 214 have a maximum priority, and the PIM hit 222 request, the PIM miss 224 request, and the PIM conflict 226 request each have a same priority level, the request ranking causes the second arbiter 216 to output the PIM hit 222 request as the priority winner 234.

In an example implementation where the system 100 is operating in a non-PIM mode (e.g., executing non-PIM requests), the second arbiter 216 selects the priority winner 234 based on a request ranking that favors non-PIM hits over non-PIM misses over non-PIM conflicts. As a specific example, in a situation where the system 100 is operating in a non-PIM mode, no PIM requests output by the first arbiter 214 have a maximum priority, and the non-PIM hit 228 request, the non-PIM miss 230 request, and the non-PIM conflict 232 request each have a same priority level, the request ranking causes the second arbiter 216 to output the non-PIM hit 228 request as the priority winner 234.

Conversely, in an implementation where at least one of the requests output by the first arbiter 214 is associated with a maximum priority (e.g., an "Urgent" priority), the second arbiter 216 triggers a mode switch if the maximum priority request is of a different mode type. As a specific example, in a scenario where the system 100 is operating in a PIM mode and no PIM requests output by the first arbiter 214 have a maximum priority, but one of the non-PIM requests has a maximum priority, the non-PIM request having the maximum priority is output as the priority winner 234. In this manner, the second arbiter 216 refrains from causing a mode switch until a request of a different mode (e.g., PIM or non-PIM) than a current operating mode of the system 100 reaches a maximum priority level. In situations where both PIM requests and non-PIM requests output by the first arbiter 214 have a maximum priority level, the second arbiter 216 biases against mode switching and continues to service requests of a mode in which the system 100 is currently operating.

The third arbiter 218 adds the priority winner 234 to a priority winner queue 236 and selects priority winners from the priority winner queue 236 for output as the scheduled request 220. In implementations where the memory controller 114 is associated with a single channel in memory that is not allocated into multiple pseudo-channels, the priority winner 234 is directly output by the third arbiter 218 as the scheduled request 220. Alternatively, in implementations where the memory controller 114 is associated with a channel in memory 110 that is allocated into multiple pseudo-channels, the arbitration logic 124 is configured to perform the functionality described herein for each of the multiple pseudo-channels simultaneously.

For instance, the first arbiter 214 selects a PIM hit 222 request, a PIM miss 224 request, a PIM conflict 226 request, a non-PIM hit 228 request, a non-PIM miss 230 request, and a non-PIM conflict 232 request for each of the multiple pseudo-channels. The second arbiter 216 then selects a priority winner 234 for each of the multiple pseudo-channels. In such an implementation where a memory channel is allocated into multiple pseudo-channels, the priority winners 234 for each of the pseudo-channels are individually output as a scheduled request 220 from the priority winner queue 236 by the third arbiter 218 in a round-robin manner.

By implementing the arbitration logic 124, the scheduling system 118 is configured to schedule requests from different PIM threads and different non-PIM threads in a different order than received by the memory controller 114 while optimizing system performance with respect to mode switching, which is not possible using conventional systems.

Figure 3:
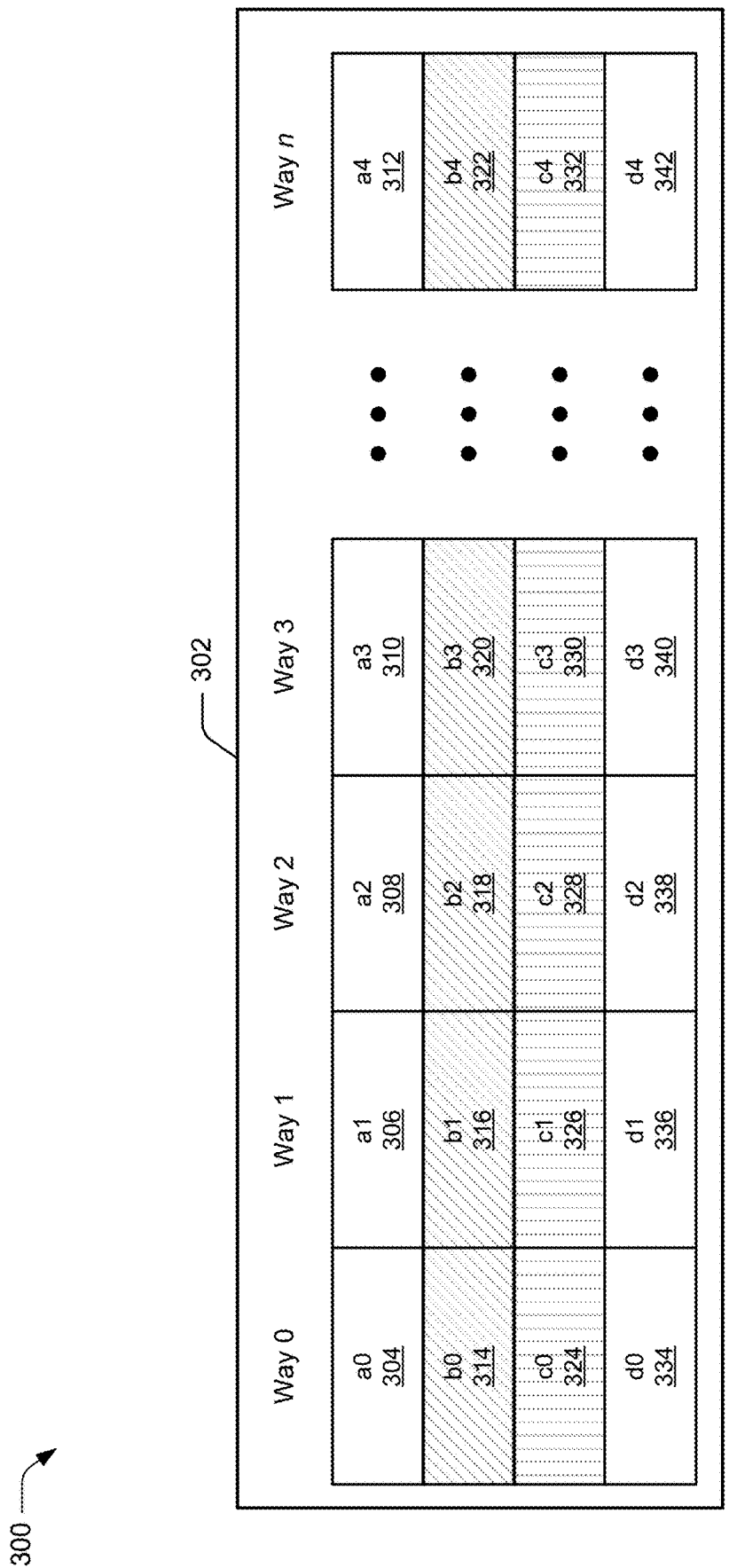
FIG. 3 depicts an example processing-in-memory queue configured to store requests of multiple processing-in-memory threads as part of scheduling requests of multiple processing-in-memory threads and non-processing-in-memory threads.

FIG. 3 depicts an example 300 of a processing-in-memory queue configured to store requests of multiple processing-in-memory threads as part of scheduling requests of multiple processing-in-memory threads and memory requests.

In the illustrated example, queue 302 represents an instance of the PIM queue 210, organized in a manner that enables the arbitration logic 124 to schedule requests from different PIM threads and different non-PIM threads in a different order than received by the memory controller 114. To do so, the queue 302 is organized such that dependent requests (e.g., requests of a common thread such as the PIM thread 202) are placed in a same row while independent requests (e.g., requests of different PIM threads) are placed in different rows. Each of the queue 302 is configured to store requests of a thread in a linear order (e.g., according to a First In, First Out (FIFO) principle), such that requests of a thread are ensured for sequential scheduling. In some implementations, if requests from one thread span across multiple rows, the multiple rows can be marked as dependent and will be serviced in insertion order to maintain the ordering requirements of PIM requests.

As depicted in FIG. 3, in some implementations the queue 302 is an array-based queue, such that a thread and its associated requests are stored in an array, where a "front" of the queue for the thread is represented by the first element of the array, and a "rear" of the queue for the thread is represented by the last element of the array. As requests for the thread are added to the queue 302, they are added to the rear of the array assigned for the thread, and as elements are removed (e.g., scheduled as part of the scheduled requests 122), the front of the array is shifted. Specifically, in the example 300, the "front" of an array is represented by entries in the "Way 0" column while the "rear" of an array is represented by entries in the "Way n" column. In accordance with the described techniques, n represents any suitable integer, as indicated by the ellipses separating the "Way 3" column from the "Way n" column.

Specifically, in the illustrated example of FIG. 1, the queue 302 is depicted as storing requests for four different threads-thread a, thread b, thread c, and thread d. Requests for thread a are represented as request 304, request 306, request 308, request 310, and request 312. Requests for thread b are represented as request 314, request 316, request 318, request 320, and request 322. Requests for thread c are represented as request 324, request 326, request 328, request 330, and request 332. Requests for thread d are represented as request 334, request 336, request 338, request 340, and request 342.

To ensure that PIM requests for a thread are not selected out of order with respect to other PIM requests of the same thread, the first arbiter 214 is configured to select requests only from the "Way 0" column of queue 302. In this manner, the first arbiter 214 is permitted to select only from request 304, request 314, request 324 and request 334 in the queue 302 when outputting PIM requests to the second arbiter 216. Requests of different threads maintained in the queue 302 are shaded to represent different request types identified by the arbitration logic 124 when outputting a scheduled request 220.

For instance, requests of thread a and thread d are not shaded to represent instances where request 304 and request 334 are each selectable for output as a PIM hit 222 request by the first arbiter 214. Requests of thread b are shaded with a diagonal line background to represent an instance where request 314 is selectable for output as a PIM miss 224 request by the first arbiter 214. Requests of thread c are shaded with a vertical line background to represent an instance where request 324 is selectable for output as a PIM conflict 226 request by the first arbiter 214.

In this manner, the illustrated example 300 depicts a situation where the first arbiter 214 is caused to output the request 314 as the PIM miss 224 request and output the request 324 as the PIM conflict 226 request to the second arbiter 216. Similarly, the first arbiter 214 is caused to select one of the request 304 or the request 334 for output as the PIM hit 222 request to the second arbiter 216 for use in selecting a priority winner 234. In implementations, the first arbiter 214 selects between the request 304 and the request 334 for output as the PIM hit 222 request based on priority information associated with the request 304 and priority information associated with the request 334 (e.g., selects the request having a higher associated priority level, or the request having a higher stall time counter if the associated priority levels are equal).

In implementations where a request from queue 302 is selected for output as the scheduled request 220, that request is removed from the queue 302 and other requests for the thread are shifted towards Way 0, such that a next sequential request for the thread occupies Way 0. As a specific example, consider a scenario where request 314 is selected for output as the scheduled request 220. In this specific example, the queue 302 is updated by shifting request 316, request 318, request 320, and request 322 towards Way 0, such that request 316 occupies Way 0, request 318 occupies Way 1, request 320 occupies Way 2, and request 322 occupies Way 3. Subsequent requests received for a thread are then inserted at a "rear" of the array assigned to the thread as they are received at the memory controller 114, thus ensuring sequential scheduling of thread requests. Having considered an example organization of a PIM queue 210 that is useable by the arbitration logic 124 to schedule requests from different PIM threads and different non-PIM threads in a different order than received at the memory controller 114, consider now example stall time logic useable to update a priority level assigned to each request.

Figure 4:
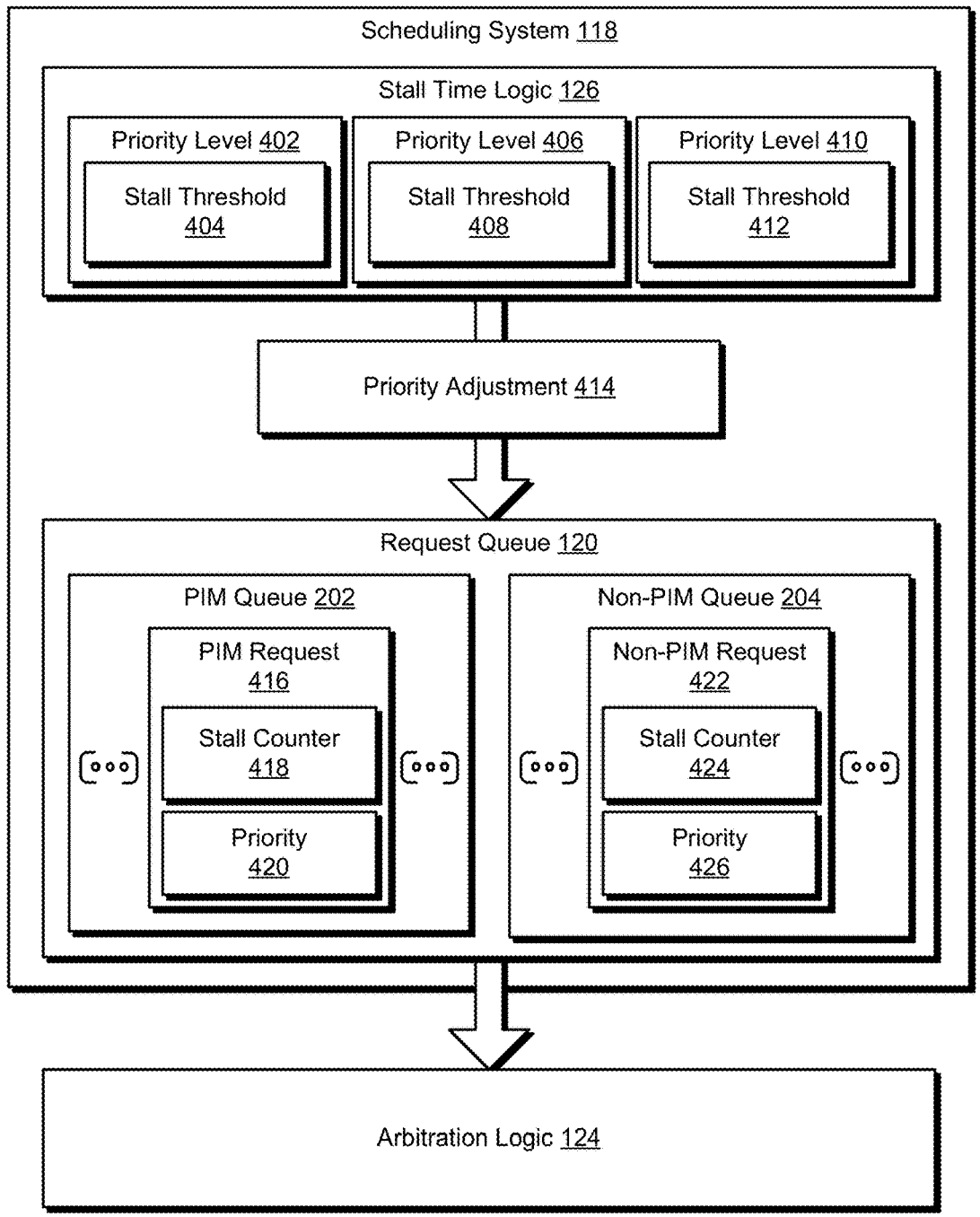
FIG. 4 depicts an example of adjusting stall counters for non-processing-in-memory requests and processing-in-memory requests enqueued at a memory controller as part of scheduling requests of multiple processing-in-memory threads and non-processing-in-memory threads.

FIG. 4 depicts an example 400 of adjusting priority information associated with individual processing-in-memory requests and individual non-processing in memory requests as part of scheduling multiple processing-in-memory threads and memory requests.

The illustrated example 400 is depicted as including the scheduling system 118 of the memory controller 114, the request queue 120 the arbitration logic 124, and the stall time logic 126. The illustrated example 400 further illustrates how the stall time logic 126 is configured to define different priority levels and their associated stall time threshold. Specifically, stall time logic 126 is depicted as defining a first priority level 402, which is assigned to a request when the request has been enqueued at the request queue 120 for a duration greater than or equal to the stall threshold 404. Stall time logic 126 is further depicted as defining a second priority level 406, which is assigned to a request when the request has been enqueued at the request queue 120 for a duration greater than or equal to the stall threshold 408. Finally, stall time logic 126 is depicted as defining a third priority level 410, which is assigned to a request when the request has been enqueued at the request queue 120 for a duration greater than or equal to the stall threshold 412.

In an example scenario, the priority level 402, the priority level 406, and the priority level 410 represent progressively increasing priority levels. For instance, in this example scenario, requests 116 are assigned a minimum priority level (e.g., Low) upon receipt by the memory controller 114 (e.g., when first enqueued at the request queue 120). Continuing this example scenario, after a request has been enqueued at the request queue 120 for a duration that satisfies the stall threshold 404, the request is assigned the priority level 402 (e.g., Medium). Continuing this example scenario, if the request persists in request queue 120 for a duration that satisfies the stall threshold 408, the priority level assigned to the request is escalated to the priority level 406 (e.g., High). Finally, in this example scenario, if the request remains enqueued in the request queue 120 for a duration that satisfies the stall threshold 412, the request is escalated to the priority level 410 (e.g., Urgent), which represents a maximum priority that can be assigned to an enqueued request.

In implementations, the stall threshold for each priority level is configurable in any suitable manner, and stall thresholds for different levels do not necessarily correlate to one another. For instance, in an example implementation, the stall threshold 404 is defined as 256 cycles, such that a request is escalated from a minimum priority to priority level 402 (e.g., Low to Medium priority) after being enqueued at the request queue 120 for 256 cycles of the system 100. Continuing this example implementation, the stall threshold 408 is defined as 512 cycles, such that a request is escalated from priority level 402 to priority level 406 (e.g., Medium to High) after being enqueued at the request queue 120 for 512 cycles of the system 100. Finally, in this example implementation, the stall threshold 412 is defined as 1024 cycles, such that a request is escalated from priority level 406 to the maximum priority level represented by priority level 410 (e.g., High to Urgent) after being enqueued at the request queue 120 for 1024 cycles of the system 100. Although described herein with respect to these example priority levels, the stall time logic 126 is configurable in any suitable manner to define any number of different priority levels with respective stall thresholds defining any suitable duration.

In some implementations, stall thresholds for different priority levels of the stall time logic 126 are designated by the memory controller 114 based on an injection rate at which requests 116 are received from the host 102. Alternatively or additionally, the memory controller 114 assigns stall thresholds to different priority levels based on an amount of enqueued requests at the request queue 120.

The stall time logic 126 is configured to dynamically adjust priorities assigned to different requests enqueued at the request queue 120 based on the priority levels and their respective stall thresholds, represented in the illustrated example 400 as priority adjustment 414. The priority adjustment 414 thus represents an instruction by the stall time logic 126 to increment a stall counter for each request maintained in the request queue 120 (e.g., increment by one for each cycle of the system 100) and escalate a priority level for individual requests whose associated stall counter satisfies a corresponding priority level stall threshold as defined by the stall time logic 126.

For instance, the stall time logic 126 communicates the priority adjustment 414 to the request queue 120 for use in updating stall counters and priority levels associated with enqueued requests 116. As an example, a PIM request 416 enqueued in the PIM thread 202 is associated with information defining a stall counter 418 and a priority 420 for the PIM request 416. The stall counter 418 describes a duration at which the PIM request 416 has been stalled at the request queue 120 (e.g., a number of system 100 cycles, a temporal duration such as nanoseconds, and so forth). The priority 420 represent information describing a priority level, defined by the stall time logic 126 assigned to the PIM request 416.

In a similar manner, a non-PIM request 422 enqueued in the non-PIM queue 210 is associated with a stall counter 424 and a priority 426. The stall counter 424 describes a duration at which the non-PIM request 422 has been stalled at the request queue 120 (e.g., a number of system 100 cycles, a temporal duration such as nanoseconds, and so forth). The priority 426 represent information describing a priority level, defined by the stall time logic 126 assigned to the non-PIM request 422. Thus, by assigning a priority level to each enqueued request, the scheduling system 118 enables the first arbiter 214 and the second arbiter 216 of the arbitration logic 124 to select from enqueued requests based on their associated priority levels. Similarly, the scheduling system 118 causes the memory controller 114 to refrain from mode switching until an enqueued request associated with a mode other than a current operating mode of the system 100 (e.g., PIM vs. non-PIM) has escalated to a maximum priority level.

Figure 5:
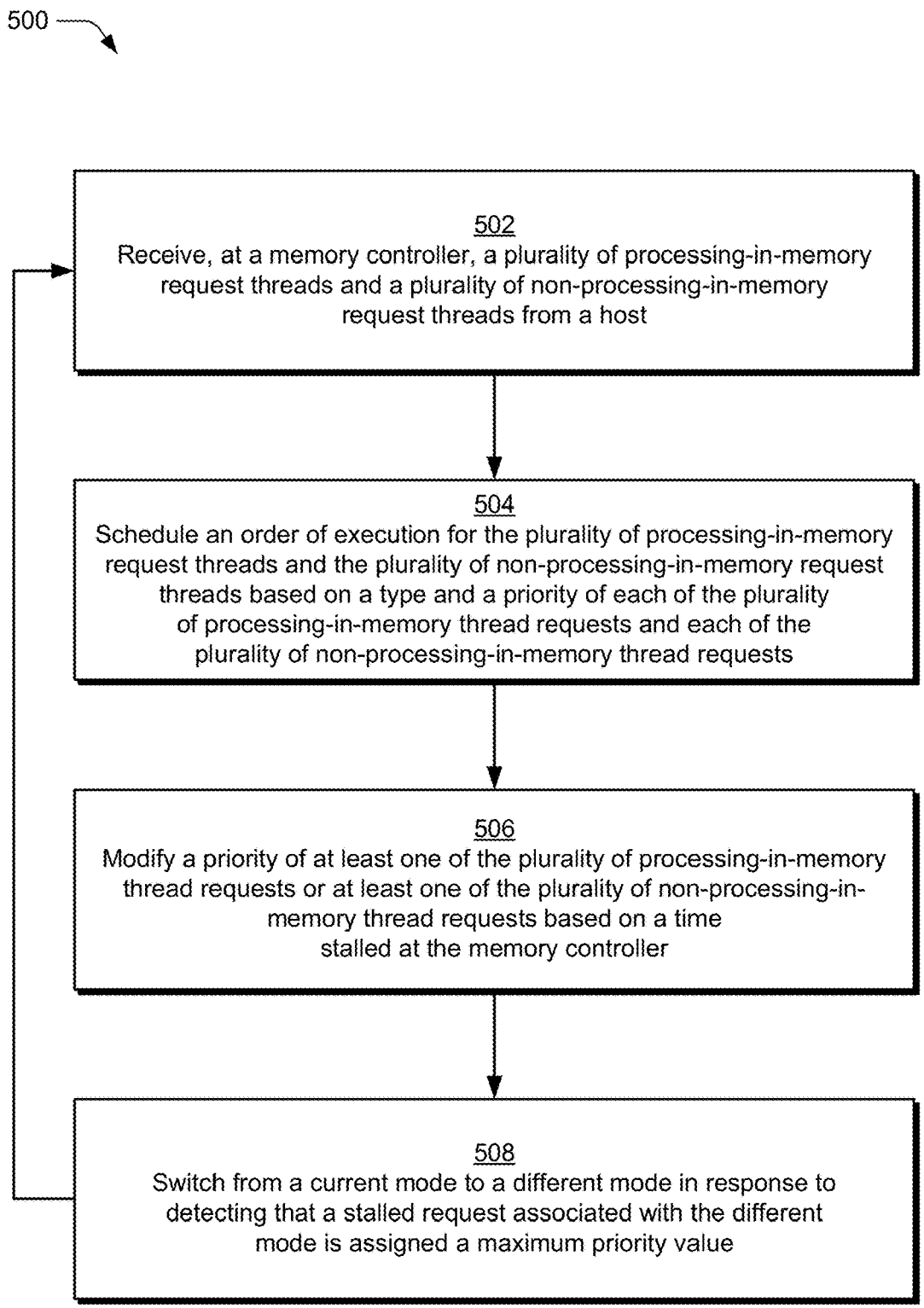
FIG. 5 depicts a procedure in an example implementation of scheduling requests of multiple processing-in-memory threads and non-processing-in-memory threads.

FIG. 5 depicts a procedure 500 in an example implementation of scheduling multiple processing-in-memory threads and memory requests.

A plurality of processing-in-memory request threads and a plurality of non-processing-in-memory threads are received from a host at a memory controller (block 502). The memory controller 114, for instance, receives PIM thread 202 and at least one non-PIM thread 206 as part of requests 116 from the host 102.

An order of execution for requests of the plurality of processing-in-memory threads and requests of the plurality of non-processing-in-memory threads are scheduled based on a type and a priority of each of the plurality of processing-in-memory thread requests and each of the plurality of non-processing-in-memory thread requests (block 504). The arbitration logic 124 of the scheduling system 118, for instance, schedules an order of the requests 116 for execution and outputs the scheduled order of requests as the scheduled requests 122. In implementations, the arbitration logic 124 orders the requests 116 for output as the scheduled requests 122 based on a current operating mode of the system 100. For instance, if the system 100 is operating in a PIM mode, the arbitration logic 124 prioritizes PIM requests for scheduling as the scheduled requests 122 over non-PIM requests based on a priority value associated with each PIM request (e.g., scheduling higher priority PIM requests over lower priority PIM requests). In a similar manner, if the system 100 is operating in a non-PIM mode, the arbitration logic 124 prioritizes non-PIM requests for scheduling as the scheduled requests 122 over PIM requests based on a priority value associated with each non-PIM request (e.g., scheduling higher priority non-PIM requests over lower priority non-PIM requests)/

A priority level of at least one of the plurality of processing-in-memory thread requests or at least one of the plurality of non-processing-in-memory thread requests is modified based on a time stalled at the memory controller (block 506). The stall time logic 126 of the scheduling system 118, for instance, communicates a priority adjustment 414 to the request queue 120 that causes the request queue 120 to increment a stall counter for each enqueued request (e.g., increment stall counter 418 for PIM request 416 and increment stall counter 424 for non-PIM request 422). In implementations where a stall counter satisfies a stall threshold for a priority level defined by the stall time logic 126, the priority adjustment 414 causes the request queue 120 to update a priority associated with the request (e.g., modify the priority 420 for PIM request 416 to the priority level 402, the priority level 406, or the priority level 410).

Operation of a system implementing the memory controller is then switched form a current mode to a different mode in response to detecting that a stalled request associated with the different mode is assigned a maximum priority value (block 508). For instance, if the system 100 is operating in a PIM mode, the arbitration logic 124 prioritizes PIM requests for scheduling as the scheduled requests 122 over non-PIM requests based on a priority value associated with each PIM request until a non-PIM request enqueued at the request queue 120 is escalated to a maximum priority value and no PIM requests enqueued at the request queue 120 have the maximum priority value. Upon a non-PIM request being enqueued with a maximum priority value, the arbitration logic 124 triggers a mode switch by scheduling non-PIM requests, beginning with non-PIM requests having the maximum priority value. In a similar manner, the arbitration logic 124 continues to prioritize non-PIM requests for scheduling as the scheduled requests 122 over PIM requests based on a priority value associated with each non-PIM request until a PIM request enqueued at the request queue 120 is escalated to the maximum priority value and no non-PIM requests in the request queue 120 have the maximum priority value.

Operation of the procedure 500 proceeds for additional requests 116 received at the memory controller 114, as indicated by the arrow returning to block 502 from block 508.

Figure 6:
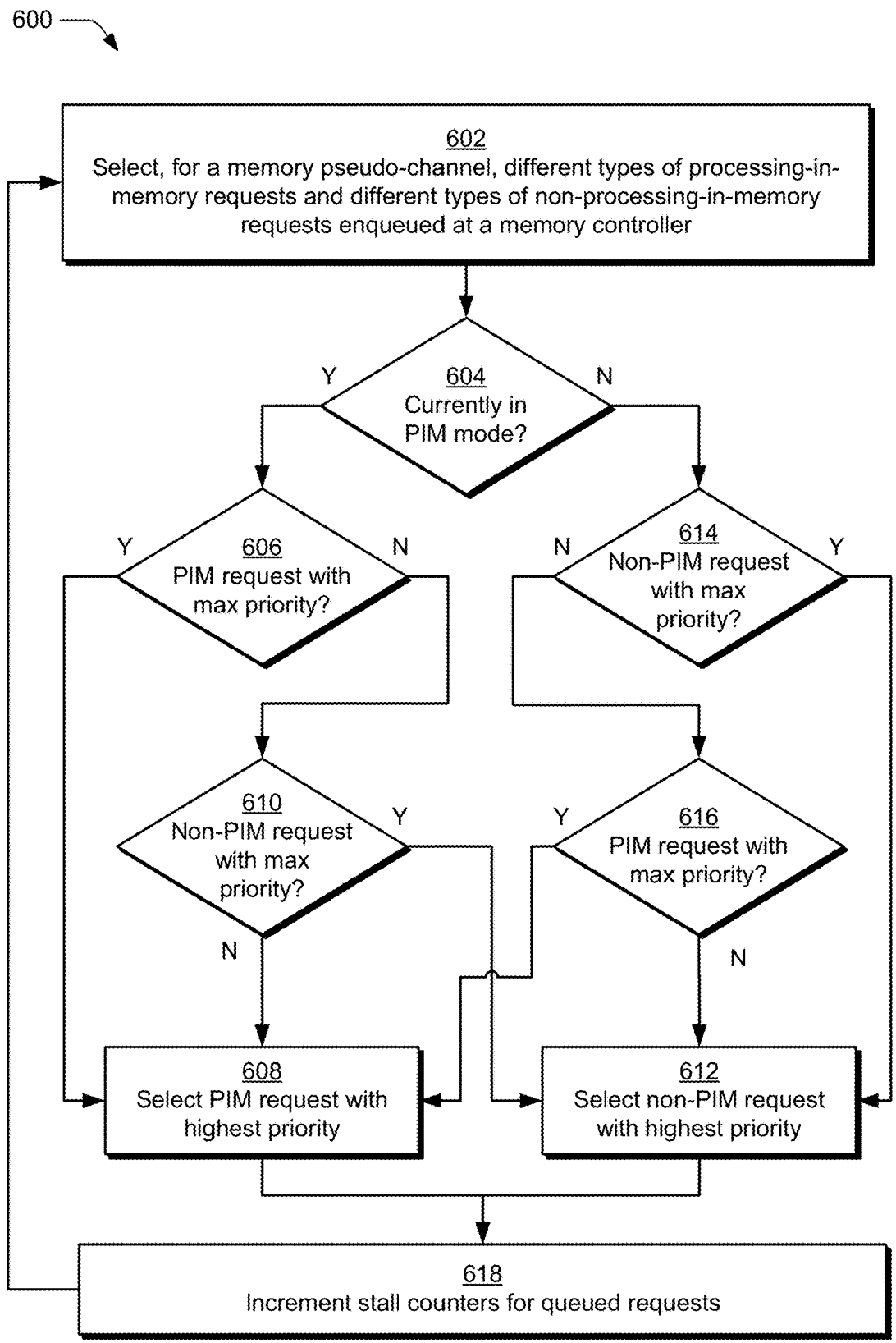
FIG. 6 depicts a procedure in an example implementation of ordering non-processing-in-memory requests and processing-in-memory requests using a multi-stage arbitration system as part of scheduling requests of multiple processing-in-memory threads and non-processing-in-memory threads.

FIG. 6 depicts a procedure 600 in an example implementation of scheduling multiple processing-in-memory threads and memory requests.

Different types of processing-in-memory requests and different types of non-processing-in-memory requests enqueued at a memory controller are selected (block 602). The arbitration logic 124, for instance, uses the first arbiter 214 to select a PIM hit 222 request, a PIM miss 224 request, and a PIM conflict 226 request from the PIM queue 210. The arbitration logic 124 further uses the first arbiter 214 to select a non-PIM hit 228 request, a non-PIM miss 230 request, and a non-PIM conflict 232 request from the non-PIM queue 212. The arbitration logic 124 is constrained to selecting dependent PIM requests (e.g., PIM requests of a common PIM thread) in an order defined by the thread. Conversely, the arbitration logic 124 is permitted to select independent PIM requests (e.g., PIM requests from different PIM threads) without constraint as to when the independent PIM requests arrived at the memory controller 114.

A determination is made as to whether a system implementing the memory controller is currently operating in a processing-in-memory mode (block 604). The memory controller 114, for instance, identifies that, at the time when the different types of PIM requests and different types of non-PIM requests would be scheduled for execution, the processing-in-memory component 112 will be executing PIM requests enqueued at the operation queue 128 (e.g., a Yes determination at block 604). Alternatively, the memory controller 114 identifies that, at the time when the different types of PIM requests and different types of non-PIM requests would be scheduled for execution, the host 102 will be executing non-PIM requests scheduled as part of the scheduled requests 122 (e.g., a No determination at block 604).

In response to a Yes determination at block 604, a determination is made as to whether one of the selected different types of PIM requests is associated with a maximum priority level (block 606). The second arbiter 216, for instance, checks each PIM request output by the first arbiter 214 and identifies whether an associated priority (e.g., whether priority 420 of PIM request 416) indicates a maximum priority level (e.g., priority level 410). In response to identifying that one or more of the PIM requests selected at block 602 is associated with a maximum priority level (e.g., a Yes determination at block 606), a PIM request selected at block 602 is selected for scheduling (block 608). The second arbiter 216, for instance, identifies one of the PIM requests output by the first arbiter 214 (e.g., the PIM hit 222 request, the PIM miss 224 request, or the PIM conflict 226 request) having the highest priority value and outputs the identified request as the priority winner 234. In implementations where two or more of the PIM hit 222 request, the PIM miss 224 request, or the PIM conflict 226 request have the highest priority value, the second arbiter 216 favors selection of PIM hits over PIM misses, over PIM conflicts as the priority winner 234.

Alternatively, returning to block 606, in response to identifying that no PIM requests output by the first arbiter 214 are associated with a maximum priority value (e.g., a No determination at block 606), a determination is made as to whether one of the selected different types of non-PIM requests is associated with a maximum priority level (block 610). The second arbiter 216, for instance, checks each non-PIM request output by the first arbiter 214 and identifies whether an associated priority (e.g., whether priority 426 of non-PIM request 422) indicates the maximum priority level (e.g., priority level 410).

If no non-PIM request output by the first arbiter 214 is associated with a maximum priority level (e.g., a No determination at block 610), operation returns to block 608 and the scheduling system 118 continues to schedule highest priority PIM requests as the priority winner 234. Alternatively, if a non-PIM request output by the first arbiter 214 is associated with the maximum priority level (e.g., a Yes determination at block 610), the non-PIM request with the highest priority level (e.g., the maximum priority level) is selected (block 612).

The second arbiter 216, for instance, identifies one of the non-PIM requests output by the first arbiter 214 (e.g., the non-PIM hit 228 request, the non-PIM miss 230 request, or the non-PIM conflict 232 request) having the highest priority value and outputs the identified request as the priority winner 234. In implementations where two or more of the non-PIM hit 228 request, the non-PIM miss 230 request, or the non-PIM conflict 232 request have the highest priority value, the second arbiter 216 favors selection of non-PIM hits over non-PIM misses, over non-PIM conflicts as the priority winner 234.

Alternatively, in response to a No determination at block 604 (e.g., when the system implementing the memory controller 114 is operating in a non-PIM mode), a determination is made as to whether one of the selected different types of non-PIM requests is associated with a maximum priority level (block 614). The second arbiter 216, for instance, checks each non-PIM request output by the first arbiter 214 and identifies whether an associated priority (e.g., priority 426 of non-PIM request 422) indicates a maximum priority level (e.g., priority level 410). In response to identifying that one or more non-PIM requests output by the first arbiter 214 have a maximum priority level (e.g., a Yes determination at block 614), operation proceeds to block 612, where the highest priority non-PIM request is selected.

Alternatively, in response to identifying that no non-PIM requests output by the first arbiter 214 have a maximum priority level (e.g., a No determination at block 614), a determination is made as to whether one of the selected different types of PIM requests is associated with the maximum priority level (block 616). The second arbiter 216, for instance, checks each PIM request output by the first arbiter 214 and identifies whether an associated priority (e.g., whether priority 420 of PIM request 416) indicates a maximum priority level (e.g., priority level 410). If no PIM request output by the first arbiter 214 is associated with a maximum priority level (e.g., a No determination at block 616), operation returns to block 612, where the highest priority non-PIM request is selected. Alternatively, if a PIM request output by the first arbiter 214 is associated with the maximum priority level, operation proceeds to block 608 where the PIM request output by the first arbiter 214 with the maximum priority level is selected.

After selecting a PIM request at block 608 or selecting a non-PIM request at block 612 for output as the priority winner 234 for the memory pseudo-channel, stall counters for enqueued requests are incremented (block 618). The request queue 120, for instance, removes the request selected at block 608 from PIM queue 210, or removes the request selected at block 612 from the non-PIM queue 212, and increments a stall counter for each request still maintained in the request queue 120. The request queue 120, for instance, increments the stall counter 418 and the stall counter 424 based on a priority adjustment 414 instruction issued by stall time logic 126. The priority adjustment 414 further causes any enqueued request having an associated stall counter that satisfies a priority level stall threshold to be assigned the priority level.

After outputting a scheduled request 220 for each memory pseudo-channel and incrementing the stall counters of enqueued requests, operation of the procedure 600 continues by returning to block 602.

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the host 102 having the core 108, the memory hardware 104 having the memory 110 and the processing-in-memory component 112, and the memory controller 114 having the scheduling system 118) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
   memory hardware including a memory and a processing-in-memory component;
   a host including at least one core; and
   a memory controller configured to:
   receive, from the host, a plurality of processing-in-memory threads and a plurality of non-processing-in-memory threads; and
   schedule an order of execution for requests of the plurality of processing-in-memory threads and requests of the plurality of non-processing-in-memory threads based on a priority associated with each of the requests and a current operating mode of the system.

2. The system of claim 1, wherein the current operating mode of the system comprises executing a first type of request and the order of execution prioritizes scheduling the first type of request in response to a second type of request not having a maximum priority level.

3. The system of claim 1, wherein the current operating mode of the system comprises executing a first type of request and the order of execution prioritizes scheduling a second type of request in response to a second type of request having a maximum priority level.

4. The system of claim 3, wherein the first type of request comprises a processing-in-memory request and the second type of request comprises a non-processing-in-memory request.

5. The system of claim 3, wherein the first type of request comprises a non-processing-in-memory request and the second type of request comprises a processing-in-memory request.

6. The system of claim 1, wherein the memory hardware is configured to execute requests of the plurality of processing-in-memory threads by causing the processing-in-memory component to execute one or more operations using data stored in the memory.

7. The system of claim 1, wherein the host is configured to execute requests of the plurality of non-processing-in-memory threads by obtaining data stored in the memory and causing the at least one core to execute one or more operations using the data.

8. The system of claim 1, wherein the order of execution comprises scheduling requests of the plurality of processing-in-memory threads in an order that is different from an order in which the requests of the plurality of processing-in-memory threads are received at the memory controller from the host.

9. The system of claim 1, wherein the memory controller is associated with a channel in the memory and the channel in the memory is allocated into two or more pseudo-channels.

10. The system of claim 1, wherein the memory controller is configured to schedule the order of execution by selecting, for each pseudo-channel of the memory, different types of requests from the plurality of processing-in-memory threads and different types of requests from the plurality of non-processing-in-memory threads using a first arbiter.

11. The system of claim 10, wherein the first arbiter selects, for each pseudo-channel of the memory, one hit request, one miss request, and one conflict request from the plurality of processing-in-memory threads.

12. The system of claim 10, wherein the first arbiter selects, for each pseudo-channel of the memory, one hit request, one miss request, and one conflict request from the plurality of non-processing-in-memory threads.

13. The system of claim 10, wherein the memory controller is configured to schedule the order of execution by selecting, using a second arbiter and for each pseudo-channel of the memory, one request from the different types of requests from the plurality of processing-in-memory threads and the different types of requests from the plurality of non-processing-in-memory threads that were selected by the first arbiter.

14. The system of claim 13, wherein the second arbiter is configured to select the one request for each pseudo-channel of the memory based on priority information associated with each of the different types of requests from the plurality of processing-in-memory threads and the different types of requests from the plurality of non-processing-in-memory threads that were selected by the first arbiter.

15. The system of claim 13, wherein the memory controller is configured to schedule the order of execution using a third arbiter that defines an ordering of requests selected by the second arbiter.

16. A method comprising:
identifying, by a memory controller of a system, that the system is operating in a processing-in-memory mode;
receiving, by the memory controller from a host of the system, a plurality of processing-in-memory threads and a plurality of non-processing-in-memory threads; and
scheduling, by the memory controller, an order of execution for requests of the plurality of processing-in-memory threads and requests of the plurality of non-processing-in-memory threads by:
prioritizing requests of the plurality of processing-in-memory threads responsive to identifying that requests of the plurality of non-processing-in-memory threads do not satisfy a maximum priority stall threshold; and
prioritizing requests of the plurality of non-processing-in-memory threads responsive to identifying that at least one of the requests of the plurality of non-processing-in-memory threads satisfies the maximum priority stall threshold.

17. The method of claim 16, wherein prioritizing the requests of the plurality of non-processing-in-memory threads is further performed responsive to identifying that the requests of the plurality of processing-in-memory threads do not satisfy the maximum priority stall threshold.

18. The method of claim 16, further comprising incrementing stall counters for requests enqueued at a request queue of the memory controller and updating priority levels of the requests enqueued at the request queue during the scheduling the order of execution.

19. A device comprising:
a memory controller configured to:
identify that the device is operating in a non-processing-in-memory mode;
receive a plurality of processing-in-memory threads and a plurality of non-processing-in-memory threads; and
schedule an order of execution for requests of the plurality of processing-in-memory threads and requests of the plurality of non-processing-in-memory threads by:
prioritizing requests of the plurality of non-processing-in-memory threads responsive to identifying that requests of the plurality of processing-in-memory threads do not satisfy a maximum priority stall threshold; and
prioritizing requests of the plurality of processing-in-memory threads responsive to identifying that at least one of the requests of the plurality of processing-in-memory threads satisfies the maximum priority stall threshold.

20. The device of claim 19, wherein the memory controller prioritizes the requests of the plurality of processing-in-memory threads responsive to identifying that the requests of the plurality of non-processing-in-memory threads do not satisfy the maximum priority stall threshold.

* * * * *